(12) United States Patent
Suehiro

(10) Patent No.: US 7,706,461 B2
(45) Date of Patent: Apr. 27, 2010

(54) COMMUNICATION METHOD, TRANSMISSION SIGNAL FORMING METHOD, AND DATA STRUCTURE OF TRANSMISSION SIGNAL

(75) Inventor: Naoki Suehiro, 18-14, Azuma 3-chome, Tsukuba-shi, Ibaraki (JP) 305-0031

(73) Assignees: Yokohama TLO Company, Ltd., Yokohama-shi (JP); Naoki Suehiro, Tsukuba-shi (JP)

(*) Notice: Subject to any disclaimer, the term of this patent is extended or adjusted under 35 U.S.C. 154(b) by 945 days.

(21) Appl. No.: 10/578,301

(22) PCT Filed: Oct. 25, 2004

(86) PCT No.: PCT/JP2004/015791

§ 371 (c)(1),
(2), (4) Date: May 4, 2006

(87) PCT Pub. No.: WO2005/046074

PCT Pub. Date: May 19, 2005

(65) Prior Publication Data
US 2007/0071117 A1 Mar. 29, 2007

(30) Foreign Application Priority Data
Nov. 6, 2003 (JP) .............................. 2003-377334

(51) Int. Cl.
*H04B 7/02* (2006.01)
(52) U.S. Cl. ........................ 375/267; 375/259; 375/260; 375/322; 375/347; 375/348; 370/335; 370/342
(58) Field of Classification Search .................. 375/140, 375/141, 147, 232, 259, 260, 267, 306, 316, 375/355, 359, 295, 328, 327, 341–343; 370/335, 370/342
See application file for complete search history.

(56) References Cited

U.S. PATENT DOCUMENTS 6,967,990 B1 * 11/2005 Suzuki et al. ................ 375/148

(Continued)

FOREIGN PATENT DOCUMENTS

JP 2002-255405 9/2002

(Continued)

OTHER PUBLICATIONS

Keisuke Higuma et al.; "Simulation of Very Efficient Wireless Frequency Usage System using Multipath Equation on Spread Time Signals", The Institute of Electronics, Information and Communication Engineers, vol. 101, No. 128, SAT2001-24, Jun. 22, 2001, pp. 21-27. Cited in the Int'l. Search Report.

(Continued)

*Primary Examiner*—Shuwang Liu
*Assistant Examiner*—Hirdepal Singh
(74) *Attorney, Agent, or Firm*—Westerman, Hattori, Daniels & Adrian, LLP

(57) ABSTRACT

In a communication method for transmitting a multipath characteristic measurement signal and a plurality of data transmission signals, the multipath characteristic measurement signal and data transmission signals are a signal array formed by a plurality of coefficient matrices that are orthogonal to one another within the matrices and which comprise at least one coefficient array that is common in the column direction or row direction. The multipath characteristic measurement signal formed by the coefficient matrices is the same signal array formed by the one common coefficient array. As a result, the transmission wait time and the signal reception time required for transmission of a multiplicity of data transmission signals are shortened in the simultaneous transmission of the multipath characteristic measurement signal and the plurality of data transmission signals by the spread modulation of transmission data by means of a spread spectrum, whereby the scale of the reception processing device is miniaturized.

9 Claims, 17 Drawing Sheets

U.S. PATENT DOCUMENTS

| | | | |
|---|---|---|---|
| 7,039,094 B2 * | 5/2006 | Kim et al. | 375/147 |
| 7,337,204 B2 * | 2/2008 | Dor et al. | 708/400 |
| 2002/0159537 A1 * | 10/2002 | Crilly, Jr. | 375/267 |
| 2002/0181554 A1 * | 12/2002 | Kim et al. | 375/147 |
| 2004/0145518 A1 * | 7/2004 | Toda et al. | 342/357.04 |
| 2005/0078761 A1 * | 4/2005 | Hottinen et al. | 375/267 |
| 2005/0185734 A1 * | 8/2005 | Hottinen et al. | 375/295 |

FOREIGN PATENT DOCUMENTS

| | | |
|---|---|---|
| JP | 2003-8547 | 1/2003 |

OTHER PUBLICATIONS

Shinya Matsufuji et al.; "Complementary ZCZ Sets", The Institute of Electronics, Information and Communication Engineers, vol. 101, No. 128, SAT2001-23, Jun. 22, 2001, pp. 17-20. Cited in the Int'l. Search Report.

International Search Report of PCT/JP2004/015791, date of mailing Jan. 11, 2005.

Translation of the International Preliminary Report on Patentability of International Application No. PCT/JP 2004/015791, with Form PCT/IB/373 and Form PCT/ISA/237.

* cited by examiner

SIGNAL SEQUENCE FOR MULTIPATH ESTIMATION $A_n = a_0\ a_1\ a_2\ \cdots\ a_{n-1}$ (ZCZ SEQUENCE)

$\phantom{A_n}= +\ +\ +\ -\ \cdots\ 0\ 0\ 0\ 0\ +\ -\ +\ +\ \cdots\ 0\ 0\ 0\ 0\ \cdots$ $\longleftarrow L_1 \longrightarrow\!\!\times\!\!\longleftarrow L_2 \longrightarrow\!\!\times\!\!\longleftarrow L_1 \longrightarrow\!\!\times\!\!\longleftarrow L_2 \longrightarrow$

TRANSMISSION DATA $B_n = b_0\ b_1\ b_2\ \cdots\ b_{n-1}$ $C_n = c_0\ c_1\ c_2\ \cdots\ c_{n-1}$ $D_n = d_0\ d_1\ d_2\ \cdots\ d_{n-1}$ $E_n = e_0\ e_1\ e_2\ \cdots\ e_{n-1}$ $\vdots\qquad\vdots\quad\vdots\quad\vdots$

FIG. 1

FIG. 6A  FIG. 6B  FIG. 6C
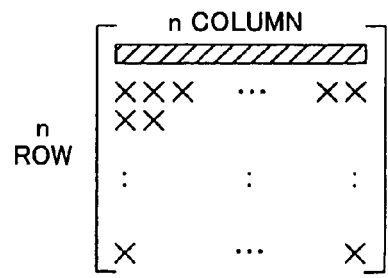
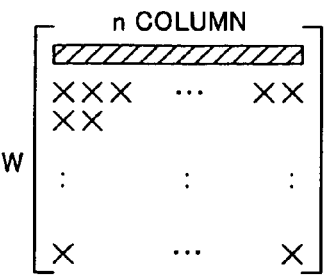
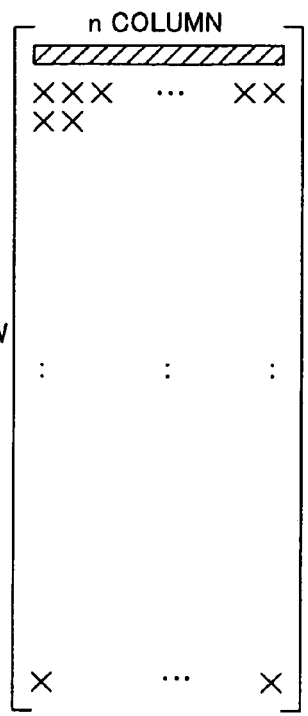
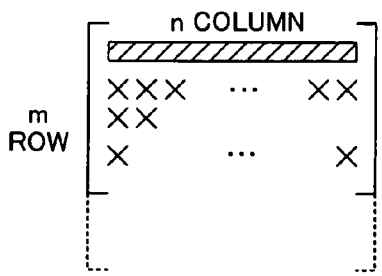
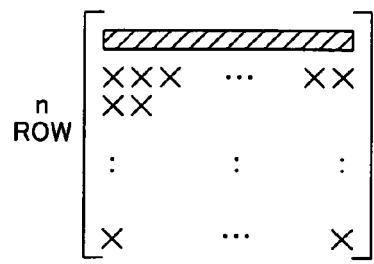

SIGNAL A  10000000010000000010000000010000000

0 3p₀ 0 0 0 0 0 0 0 0 4p₀ 0 0 0 0 0 0 0 0 3p₀ 0

0 3p₁ 0 0 0 0 0 0 0 0 4p₁ 0 0 0 0 0 0 0 0 3p₁ 0

0 3p₂ 0 0 0 0 0 0 0 0 4p₂ 0 0 0 0 0 0 0 0 3p₂ 0

0 3p₃ 0 0 0 0 0 0 0 0 4p₃ 0 0 0 0 0 0 0 0 3p₃ 0

--- x x x x 0 0 0 0 0 4P₀ 4P₁ 4P₂ 4P₃ 0 0 0 0 0 x x x x

FIG. 12A    A MATCHED FILTER
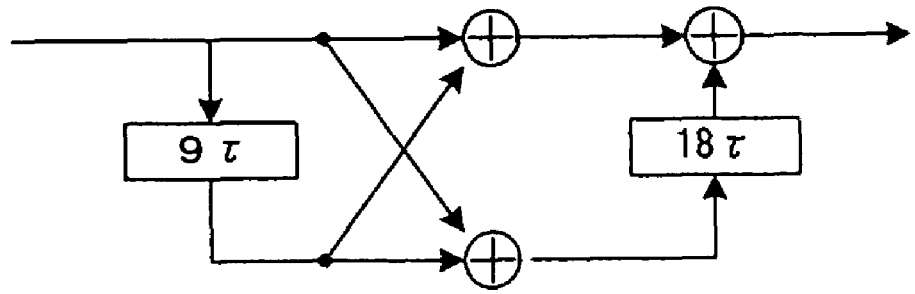
FIG. 12B    B MATCHED FILTER
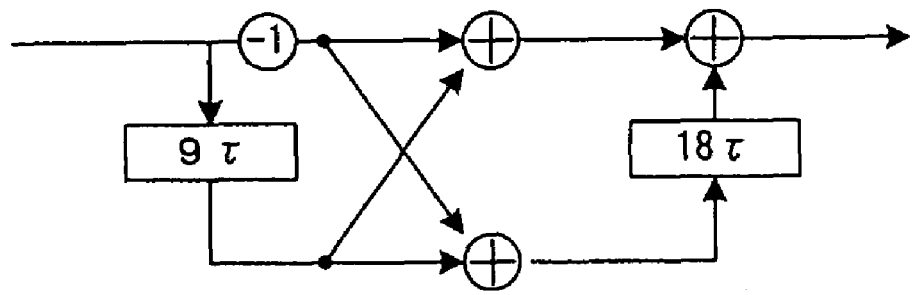
FIG. 12C    C MATCHED FILTER
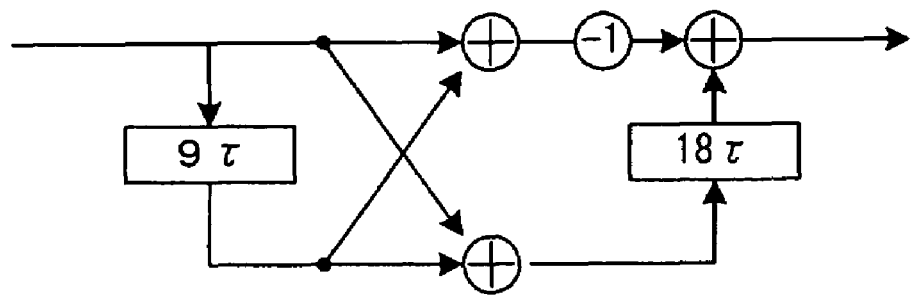
FIG. 12D    D MATCHED FILTER
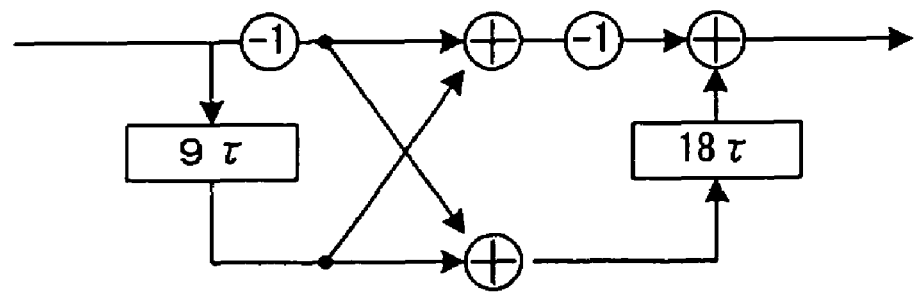

FIG. 15A
MULTIPATH CHARACTERISTIC
FAVORABLE
↓
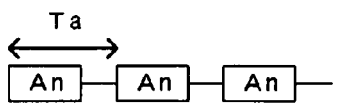
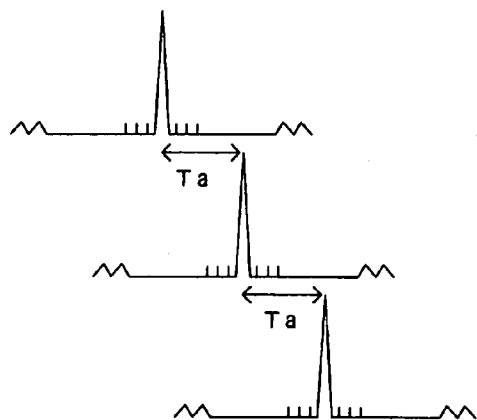
FIG. 15B
MULTIPATH CHARACTERISTIC
UNFAVORABLE
↓
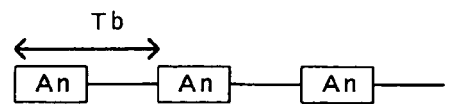
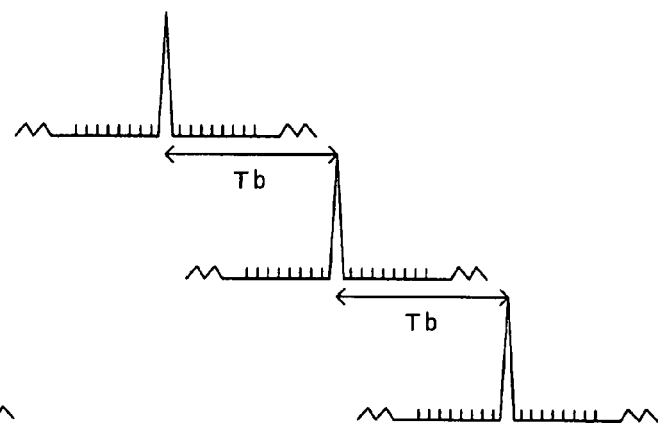

COMMUNICATION METHOD, TRANSMISSION SIGNAL FORMING METHOD, AND DATA STRUCTURE OF TRANSMISSION SIGNAL

TECHNICAL FIELD

The present invention relates to a method of forming a transmission signal, a communication method that uses the transmission signal, and a transmission signal data structure, and is particularly suited to a multipath environment of mobile communications or the like.

BACKGROUND ART

There has been a need for technology that increases the usage efficiency of wireless frequency resources in accordance with the increased demand for data communications in a variety of mobile environments and cellular wireless communications. The CDMA system, for example, is known as a system that increases the usage efficiency of wireless frequency resources by differentiating a plurality of users. In a communication system using the CDMA system, the interchannel interference caused by a spreading sequence correlation characteristic and a transmission line multipath characteristic is a primary factor that limits the frequency usage efficiency.

A system that employs Orthogonal Frequency Division Multiplexing (OFDM) involves frequency multiplexing using a sine wave and there is therefore the problem that the multipath effect is represented as fading of the signal power and separation of the transmission sine signal and multipath sine signal is problematic.

As a spreading code sequence for separating the source transmission signal and the multipath signal, a communication system that employs a complete complementary sequence, for example, has been proposed. A complete complementary sequence is a sequence that comprises an autocorrelation characteristic for which the sum of the autocorrelation functions of the respective sequences is 0 for all shifts other than a zero shift and a mutual correlation characteristic for which the sum of the mutual correlation functions of the respective sequences is always 0 for all the shifts. A ZCZ (zero correlation zone) signal without side lobes and interchannel interference and so forth is formed by using the complete complementary sequence such that the transmission signal frequency spectrum is uncorrelated. As a result, the same frequency and same time can be allocated to the pilot signal and transmission signal.

The present applicant proposed, in Patent Application No. 2002-255405, a signal design such that all of the multipath characteristic measurement signals and the plurality of data transmission signals transmitted simultaneously do not interfere with one another in transmission data modulation using a spread spectrum.

FIG. 16 is an example of a conventionally proposed signal design method. A square orthogonal matrix in which the row vectors and column vectors are orthogonal to one another is used to perform spread spectrum modulation on a multipath characteristic measurement signals An and a plurality of data transmission signals Bn, Cn, and Dn. For example, for the multipath characteristic measurement signals An, the signal array (An, An, An, An) is formed and, for the data transmission signals Bn, Cn, and Dn, the respective signal arrays (Bn, −Bn, Bn, −Bn), (Cn, Cn, −Cn, −Cn) and (Dn, −Dn, −Dn, Dn) are formed, whereby all the multipath characteristic measurement signals and plurality of data transmission signals do not interfere with one another. Further, here, a case where the square orthogonal matrix is a 4 by 4 matrix is shown.

As mentioned earlier, in a signal design such that all the multipath characteristic measurement signals and plurality of data transmission signals do not interfere with one another, a large matrix is required when transmitting a multiplicity of data transmission signals. As a result, there is the problem that the scale of the processing device required for data reception on the reception side is then large and the processing time is long and the problem that the wait time required for data transmission on the transmission side is long.

In FIG. 17, when all of the P signals of the multipath characteristic measurement signals An and the multiplicity of data transmission signals Bn to Zn are transmitted, a P×P square orthogonal matrix must be used in accordance with the number of signals P. The length of the signals in the time axis direction of the signal array formed by the square orthogonal matrix increases in accordance with the number of columns P. Therefore, the greater the number of signals transmitted, the longer the wait time required for transmission and the longer the time required for the signal reception. Further, the scale of the matching filter that extracts a predetermined signal from the reception signal also increases in accordance with the number of columns P.

DISCLOSURE OF THE INVENTION

Therefore, the present invention solves the conventional problem and an object of the present invention is to shorten the transmission wait time required for transmission of a multiplicity of data transmission signals as well as the signal reception time in the simultaneous transmission of the multipath characteristic measurement signals and plurality of data transmission signals and to minimize the scale of the reception processing device by means of spread modulation of transmission data using a spread spectrum.

A further object of the present invention is to increase the number of transmissions of transmitted data transmission signals with respect to a predetermined time wait time and a signal reception time.

A further object of the present invention is to determine the maximum number of transmissions of the transmitted data transmission signal for a predetermined time wait time and signal reception time.

In order to separate the transmission signal and multipath signal at the same frequency and same time, it is important to receive the multipath characteristic measurement signals without being subjected to the effect of interference.

In a conventionally proposed signal design, by establishing a signal design such that all the signals, namely, the multipath characteristic measurement signals and the plurality of data transmission signals, do not interfere with one another, signal interference with respect to the multipath characteristic measurement signals is prevented. As a result, when the multiplicity of data transmission signals are transmitted, a large matrix that corresponds with all transmission signal numbers is required.

On the other hand, the present invention designs signals so that interference between the respective data transmission signals is permitted and so that a plurality of data transmission signals do not interfere with at least the multipath characteristic measurement signals and allows the multipath characteristic measurement signal to be separated from the data transmission signal. Further, the data transmission signals can be restored by means of error code correction and so forth.

As a result, the scale of the matrix required for the signal design is substantially reduced, whereby the transmission wait time and signal reception time required for transmission of a multiplicity of data transmission signals are shortened and the scale of the reception processing device is minimized. Conversely, this increases the number of transmissions of the transmitted data transmission signal with respect to a predetermined transmission wait time and signal reception time.

Furthermore, the multipath characteristic of the transmission system is measured by using multipath characteristic measurement signals and, based on the measured multipath characteristic, the maximum number of transmissions of the transmitted data transmission signal is determined in the range of the transmission power of the transmission wait time and signal reception time of the transmission system.

The present invention is able to provide the respective aspects of a communication method, a method for forming a transmission signal, and a transmission signal data structure.

The communication method of the present invention is a communication method for transmitting a multipath characteristic measurement signal and a plurality of data transmission signals, wherein the multipath characteristic measurement signal and data transmission signals are a signal array formed by a plurality of coefficient matrices that are orthogonal to one another within the matrices and which comprise at least one coefficient array that is common in the column direction or row direction; and the multipath characteristic measurement signal formed by the respective coefficient matrices is the same signal array formed by the one common coefficient array.

As a result, a signal design is established such that the multipath characteristic measurement signals and data transmission signals are uncorrelated, one of the multipath characteristic measurement signals that is uncorrelated to all the data transmission signals is transmitted, and a plurality of data transmission signals do not interfere with at least the multipath characteristic measurement signals.

As an aspect in which the transmitted multipath characteristic measurement signals and plurality of data transmission signals are uncorrelated, a multipath characteristic measurement signal array is formed by using a coefficient array of one row vector or column vector with respect to multipath characteristic measurement signals and a data transmission signal array is formed by using a coefficient array of a row vector that is orthogonal to the row vector used in the formation of the multipath characteristic measurement signal array with respect to a plurality of data transmission signals or a coefficient array of a column vector that is orthogonal to the column vector used in the formation of the multipath characteristic measurement signal array.

The formation of the multipath characteristic measurement signal array and the data transmission signal array involves forming a matrix of an arbitrary length by selecting a common row vector or column vector from a plurality of orthogonal square matrices comprising a common row vector or column vector and arbitrary numbers of row vectors or column vectors that are orthogonal to the former row vector or column vector. The multipath characteristic measurement signal array is formed by multiplying the respective common row vector or column vector coefficient arrays by a multipath characteristic measurement signal in the matrix thus formed, and the data transmission signal array is formed by multiplying each of the other row vector or column vector coefficient arrays in the matrix by a plurality of data transmission signals. The multipath characteristic measurement signal array and data transmission signal array thus formed constitute a transmission signal. As an orthogonal square matrix, a Hadamard matrix or unitary matrix can be used.

When forming a multipath characteristic measurement signal array and a data transmission signal array by multiplying the respective row vector or column vector coefficient arrays by the multipath characteristic measurement signal and data transmission signal, 0 data of a predetermined length is added between the respective signals multiplied by the coefficient arrays and the interval between the multipath characteristic measurement signals in the multipath characteristic measurement signal array and the interval between the data transmission signals in the data transmission signal array are determined.

A transmission signal that corresponds with a multipath characteristic can be designed by feeding back the received multipath characteristic measurement signal to the transmission side.

A first aspect of transmission design for transmission using feedback establishes the number of row vectors or column vectors used in the formation of the data transmission signal array on the basis of the received multipath characteristic measurement signals. For example, when the multipath characteristic in the transmission line is favorable, for example, the number of row vectors or column vectors used in the formation of the data transmission signal array can be increased and the number of transmitted data transmission signals can be increased. Conversely, when the multipath characteristic in the transmission line is not favorable, the numbers of row vectors or column vectors used in the formation of the data transmission signal array can be reduced to reduce the number of transmitted data transmission signals.

A second aspect of a transmission design for transmission using feedback involves setting the interval between signals in the signal array on the basis of the received multipath characteristic measurement signals. On the transmission side, when a multipath characteristic measurement signal array and data transmission signal array are formed by arranging multipath characteristic measurement signals and data transmission signals to correspond with a row vector or column vector coefficient array, the interval between the respective multipath characteristic measurement signals or the interval between the data transmission signals is changed on the basis of the fed back multipath characteristic measurement signals.

For example, the interval between the respective signals is set short when the multipath characteristic in the transmission line is favorable and the interval between the signals is set long when the multipath characteristic is unfavorable. The length of the signal array can be shortened and the transmission wait time and reception processing time and so forth can be shortened by setting the interval between signals short.

Further, an arbitrary user arbitrarily provides a matched filter that corresponds with the coefficient array used in the formation of the transmission data array and is able to receive an arbitrary data transmission signal via the matched filter. An aspect in which one user uses all the data transmission signal channels is possible and an aspect in which channels are used through division by a plurality of users is also possible.

As described hereinabove, the present invention makes it possible to shorten the transmission wait time and signal reception time required for the transmission of a multiplicity of data transmission signals in the simultaneous transmission of the multipath characteristic measurement signals and the plurality of data transmission signals and to minimize the scale of the reception processing device by means of spread modulation of transmission data using a spread spectrum.

Further, the number of transmissions of the transmitted data transmission signal can be increased for a predetermined transmission wait time and signal reception time.

Furthermore, the maximum number of transmissions of the transmitted data transmission signal can be determined for a predetermined transmission wait time and signal reception time.

BRIEF DESCRIPTION OF THE DRAWINGS

FIG. 1 serves to illustrate a multipath characteristic measurement signal and a data transmission signal;

FIG. 6 serves to illustrate a constitutional example of the matrix used by the present invention;

FIG. 12 shows a constitutional example of the matched filter;

FIG. 15 serves to illustrate the relationship between the time interval T between one signal and the next signal and the time interval T between the signal sequences An;

BEST MODE FOR CARRYING OUT THE INVENTION

Embodiments of the present invention will be described in detail hereinbelow with reference to the drawings.

FIG. 1 serves to illustrate a multipath characteristic measurement signal and data transmission signal of the present invention. The multipath characteristic measurement signal is a signal sequence that is transmitted from the transmission side to the reception side in order to measure the multipath characteristic of the transmission line and is formed by a ZCZ sequence.

The ZCZ sequence is a sequence that holds a frequency zero correlation zone that comprises a zero autocorrelation zone characteristic and a zero mutual correlation zone characteristic. For example, a complete complementary array can be used as a predetermined coefficient array. The complete complementary array is a sequence that comprises an autocorrelation characteristic for which the sum of the autocorrelation functions of the respective sequences is zero for all shifts other than a zero shift and a mutual correlation characteristic for which the sum of the mutual correlation functions of the respective sequences is always zero for all shifts.

For example, in FIG. 1, the multipath characteristic measurement signal $An=a_0\ a_1\ a_2\ \ldots\ a_{n-1}$ uses signal arrays '+++−...+', '+−++...+', ... of length L1 obtained from the unitary matrix or the like, for example. '+++−...+' is selected as $a_0$, '+−++...+' is selected as $a_1$ and '000...0' of length L2 is interposed between the respective signal arrays a. The signal arrays form a signal array of time interval T that has a length L1+L2 that can be formed by connecting the signal arrays.

Furthermore, similar signal array formation can be implemented in a case where the data transmission signals are $Bn=b_0\ b_1\ b_2\ldots b_{n-1}, Cn=c_0\ c_1\ c_2\ldots c_{n-1}, Dn=d_0\ d_1\ d_2\ldots d_{n-1}, En=e_0\ e_1\ e_2\ldots e_{n-1}, \ldots$ with data lengths of arbitrary n bits.

The present invention is a communication method that transmits the multipath characteristic measurement signal An and the data transmission signals Bn, Cn, Dn, En, ... at the same time and implements signal design such that all the data transmission signals Bn, Cn, Dn, En, ... are uncorrelated with respect to the one multipath characteristic measurement signal An and the plurality of data transmission signals Bn, Cn, Dn, En, ... do not interfere with at least the multipath characteristic measurement signal An.

Figure 2:
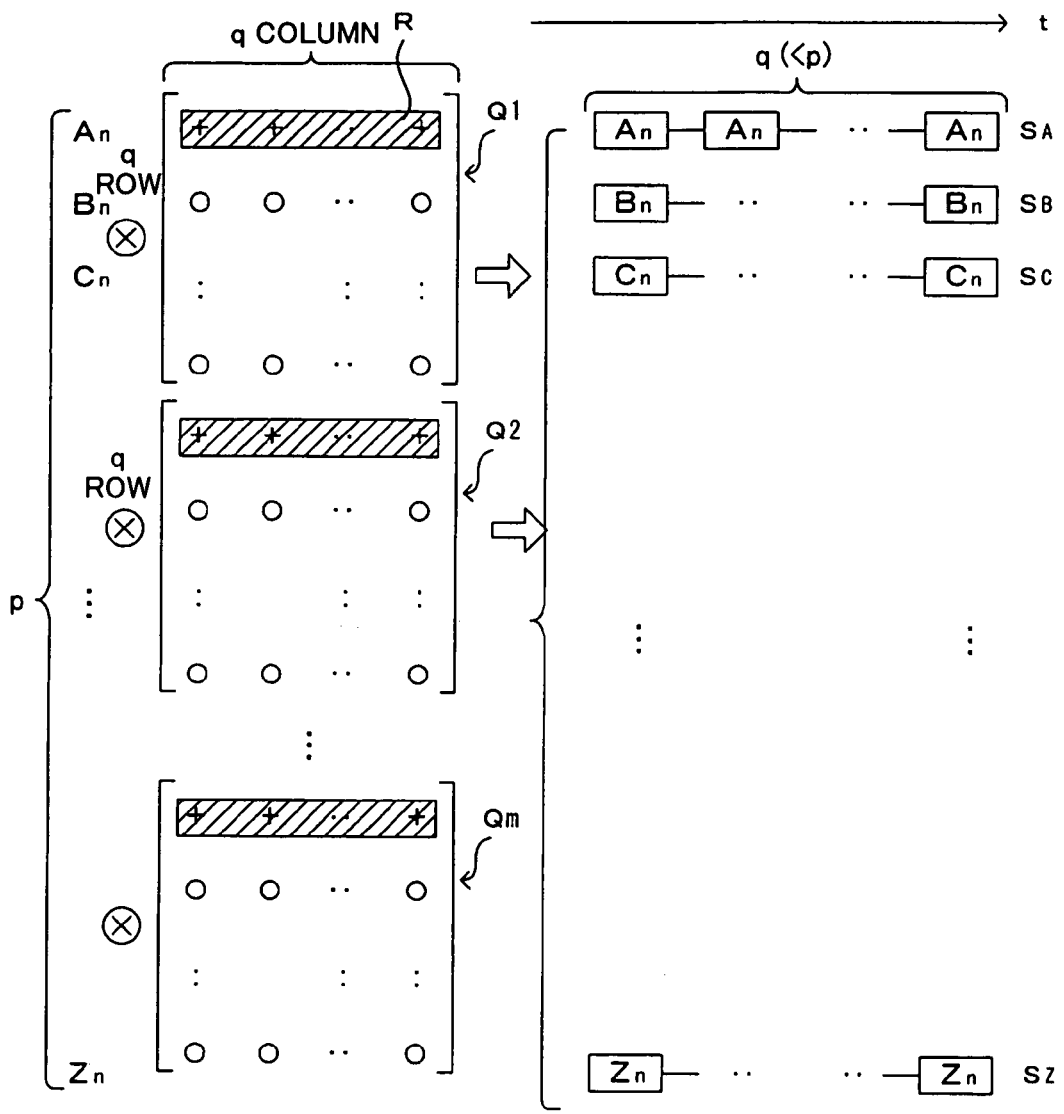
FIG. 2 serves to illustrate the signal design of the present invention.

FIG. 2 serves to illustrate the signal design of the present invention.

The present invention uses a plurality of orthogonal square matrices comprising a common row vector or column vector so that all the data transmission signals Bn, Cn, Dn, En, ... are uncorrelated with respect to the one multipath characteristic measurement signal An. A matrix of arbitrary length is formed by selecting, from a plurality of orthogonal square matrices, the row vector or column vector that the orthogonal square matrices each have in common and arbitrary numbers of row vectors or column vectors that are orthogonal to the row vector or column vector.

In FIG. 2, a plurality of matrices Q1, Q2, ..., Qm, are q by q orthogonal square matrices and the matrices Q1, Q2, ..., Qm each comprise a common row vector or column vector. Further, FIG. 2 shows a case with a row vector R (oblique line parts) is the common vector. In FIG. 2, elements of other vectors ('+' or '−', for example) are indicated by a white circle sign. In each of the matrices Q1, Q2, ..., Qm, although the row vector R is orthogonal to the other row vectors, the orthogonality between the row vectors between the respective matrices Q1, Q2, ..., Qm is not protected.

That is, the row vectors R in the respective matrices Q are orthogonal to the other row vectors in the matrices Q such that the row vector R of matrix Q1 is orthogonal to the other row vectors in matrix Q1 and the row vector R of matrix Q2 is orthogonal to the other row vectors in matrix Q2. However, the row vector R of a certain matrix Q is not limited to being orthogonal to the row vectors of other matrices such that the row vector R of matrix Q1 is not limited to being orthogonal to the row vectors in the other matrices Q2 to Qm and the row vector R of matrix Q2 is not limited to being orthogonal to the row vectors of the other matrices Q1 and Q3 to Qm.

The orthogonal square matrix can be a Hadamard matrix, for example. When an n-order square matrix H is a Hadamard matrix, the elements consist of only '+' and '−', $H^T \cdot H = nI_n$ is satisfied, and, for the existence of a Hadamard matrix, n is 1 or 2 or a multiple of 4.

A matrix is formed by selecting a common row vector R and another row vector from a plurality of matrices Q1, Q2, ..., Qm with respect to p signals of the multipath characteristic measurement signals An and a plurality of data transmission signals Bn, Cn, ..., Zn. The number of the other row vectors selected from the plurality of matrices Q1, Q2, ..., Qm is the same number as the number (p−1) of at least the data transmission signals Bn, Cn, ..., Zn.

A multipath characteristic measurement signal array SA is formed by applying a common row vector R to the multipath characteristic measurement signals An. The formation of the multipath characteristic measurement signal array SA can be determined by the Kronecker product of the multipath characteristic measurement signal An and row vector R. The number of multipath characteristic measurement signals An contained in the multipath characteristic measurement signal array SA thus formed is the number (q) of columns in the matrix. Because row vectors and column vectors in a number equal to or more than the transmitted signal number p are required when one orthogonal square matrix is used, the number of multipath characteristic measurement signals An contained in the multipath characteristic measurement signal array thus formed is at least p.

Figure 17:
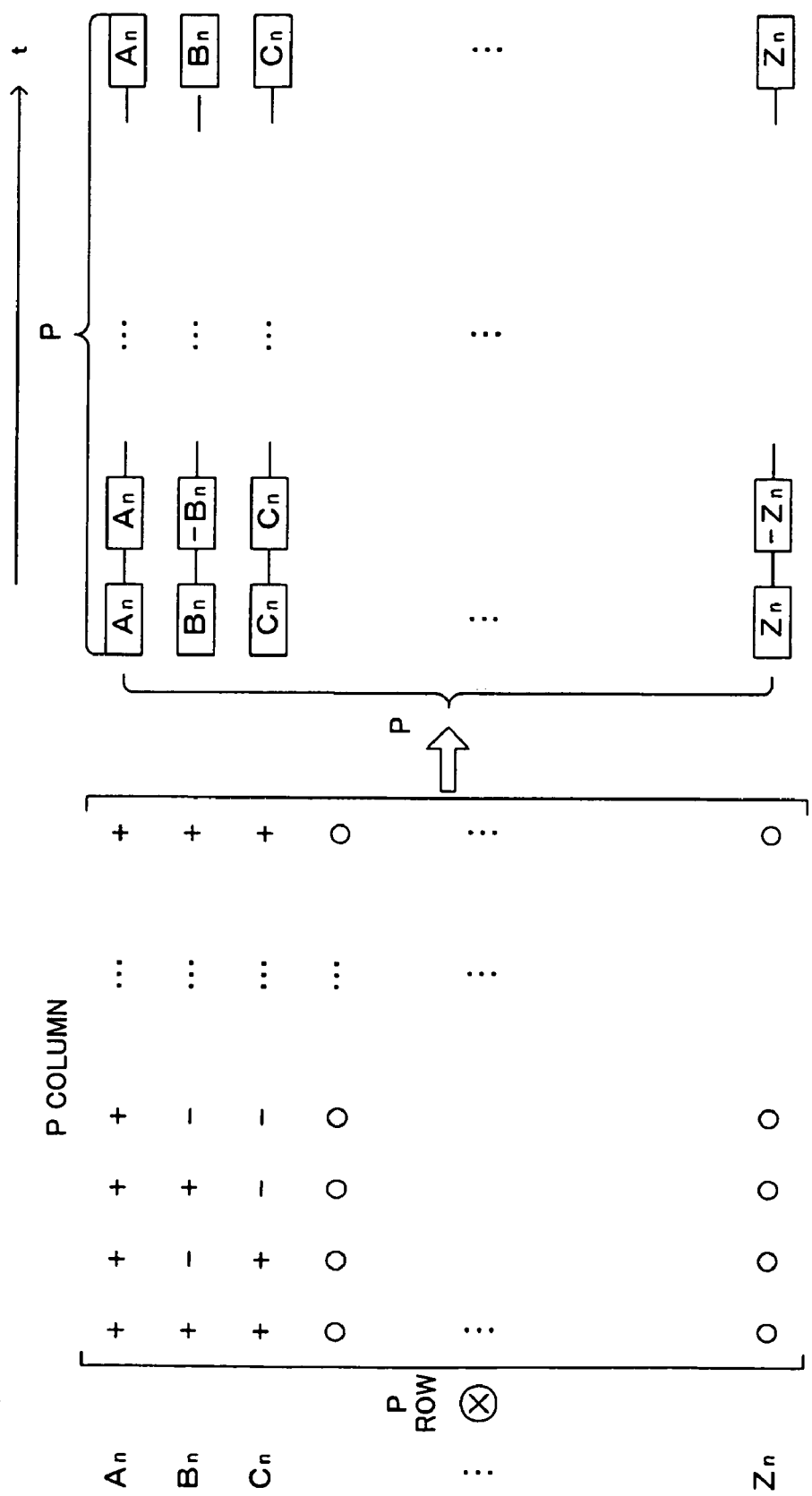
FIG. 17 serves to illustrate the relationship between the size of the matrix used in the spread modulation and the reception signal array.

Further, data transmission signal arrays SB, SC, ..., SZ are formed by applying a plurality of row vectors that are orthogonal to the common row vector R to the data transmission signals Bn, Cn, ..., Zn in the same way. The formation of the data transmission signal arrays SB, SC, ..., SZ can be determined by the Kronecker product of the data transmission signals Bn, Cn, ..., Zn and the respective row vectors. The individual number of data transmission signals Bn, Cn, ..., Zn contained in the data transmission signal arrays SB, SC, ..., SZ thus formed is the number (q) of columns in the matrix. Because row vectors and column vectors in a number equal to or more than the transmitted signal number p are required as shown in FIG. 17 when one orthogonal square matrix is used, the number of data transmission signals contained in the data transmission signal array thus formed is at least p. However, the present invention makes it possible to reduce this number.

Therefore, the present invention makes it possible to reduce the number of columns of the multipath characteristic measurement signal array and plurality of data transmission signal arrays thus formed, whereby the transmission wait time and reception processing time can be shortened and the reception-side device can be simplified.

FIG. 3 serves to illustrate a plurality of matrices that are used to form a transmission signal.

When the size of each orthogonal square matrix is q by q, the number of orthogonal square matrices prepared is decided in accordance with the value of the quotient obtained by dividing the number p of transmitted data transmission signals by the size q of the orthogonal square matrices. The number of orthogonal square matrices is the number of the quotient when division is performed and the number produced when 1 is added to the quotient when no division is performed.

The plurality of orthogonal square matrices thus prepared comprise a common row vector. A multipath characteristic measurement signal array is formed by performing spread modulation on the multipath characteristic measurement signal by using this [common] row vector and a data transmission signal array is formed by performing spread modulation on the data transmission signal by using another row vector.

The size of the orthogonal square matrix can be decided in accordance with the number of data transmission signals transmitted. For example, when an orthogonal square matrix is a Hadamard matrix, the size is a multiple of four when the degree n is 4 or more. Although the larger the degree, the larger the degree that one matrix has. However, because, as the column number increases in length, the length of the transmission signal increases by the column number, only the number of row vectors used is increased by preparing a plurality of orthogonal square matrices of a predetermined size.

On the other hand, when the degree n is small, the number of orthogonal square matrices obtained decreases. Therefore, a number of row vectors that is adequate to perform spread modulation on the transmitted data transmission signals is obtained and the size of the orthogonal square matrices needs to be determined so that the column number does not increase in length.

Figures 3A, 3B:
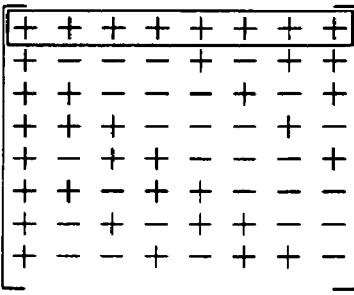
FIG. 3 serves to illustrate a plurality of matrices that are used to form the transmission signal of the present invention.

FIG. 3A shows orthogonal square matrices X1, X2, ..., Xn that are prepared for the transmitted data transmission signals Ax, Bx, Cx, ..., Hx, Ix, ..., ax, βx, ..., ?x and FIG. 3B shows orthogonal square matrices Y1, Y2, ..., Yn that are prepared for the transmitted data transmission signals Ay, By, Cy, ..., Hy, Iy, ..., ay, βy, ..., ?y.

In the matrix of FIG. 3A, a row vector Ax is provided as a common row vector for the matrices used for the multipath characteristic measurement signal and, in the matrix of FIG. 3B, a row vector Ay is provided as a common row vector for the matrices used for the multipath characteristic measurement signal.

Figure 4:
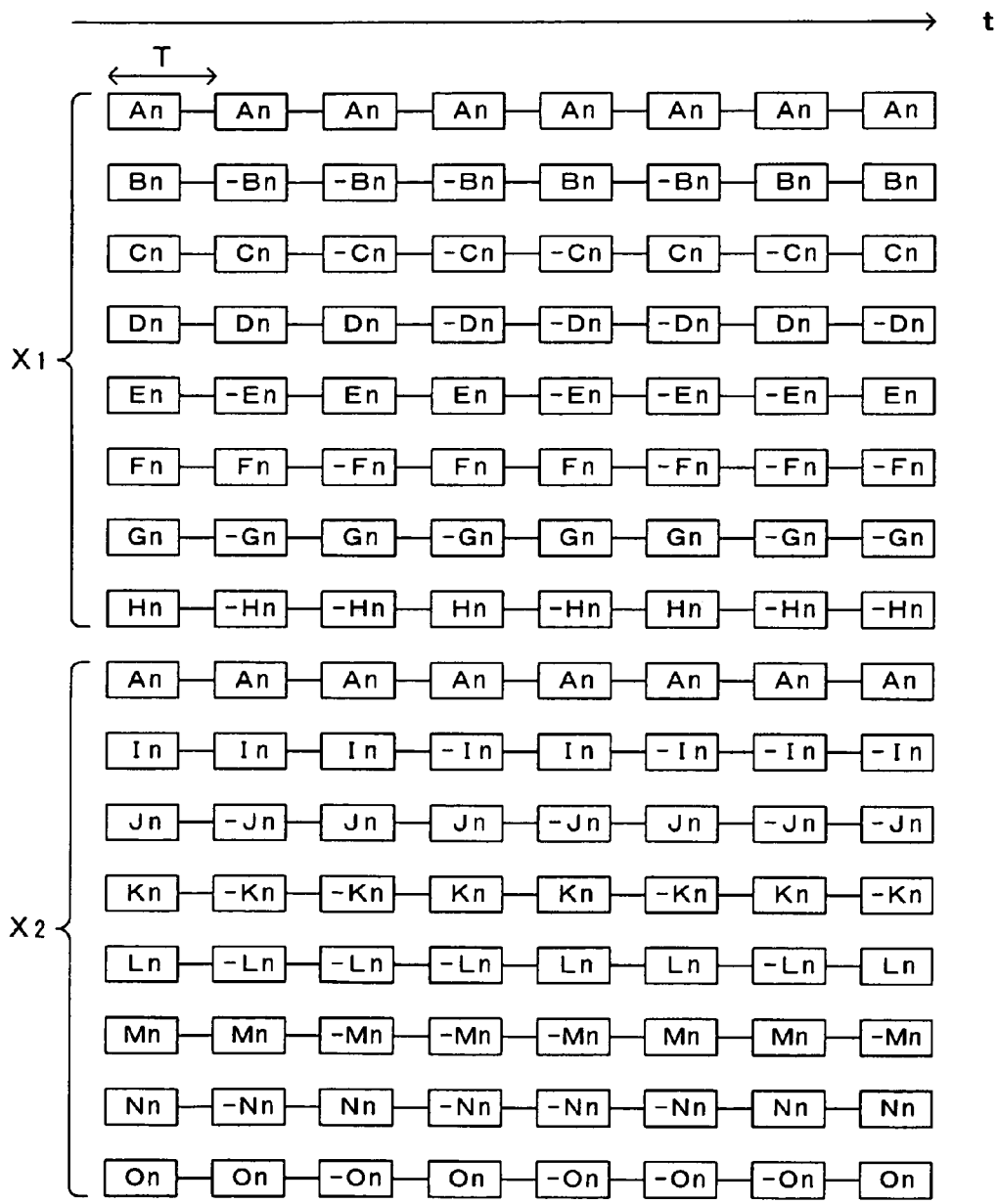
FIG. 4 serves to illustrate the transmission signal array formed by the present invention.

FIG. 4 serves to illustrate the transmission signal arrays thus formed. The example shown in FIG. 4 schematically shows the transmission signal arrays obtained when the multipath characteristic measurement signal Ax and the data transmission signals Bx to Ox are spread-modulated by means of two 8 by 8 Hadamard matrices X1 and X2, the transmission signal arrays being formed and transmitted as time, which is shown in the direction of the arrow, elapses. Further, the interval between the respective signals (Ax, Bx to Ox) is a predetermined time interval T and a 0 signal is added to each predetermined time slot and transmitted.

In FIG. 4, because the multipath characteristic measurement signal Ax has the matrix coefficient array '++++++++', a multipath characteristic measurement signal array 'An, 0, ..., 0, An, 0, ..., 0, An, 0, ..., 0, An, 0, ..., 0, An, 0, ..., 0, An, 0, ..., 0, An, 0, ..., 0, An, 0, ..., 0,' is formed. Likewise, because the data transmission signal Bx has the matrix coefficient array '+−−−+−++', the data transmission signal array 'Bn, 0, ..., 0, −Bn, 0, ..., 0, −Bn, 0, ..., 0, −Bn, 0, ..., 0, Bn, 0, ..., 0, −Bn, 0, ..., 0, Bn, 0, ..., 0, Bn' is formed. The data transmission signals Cn to On are also similar.

Further, 'An, 0, ..., 0', 'Bn, 0, ..., 0' are formed by continually adding a signal 0 to each of An and Bn when the time interval is T. Further, the code '−' in FIG. 4 represents '0, ..., 0'.

Here, although an 8 by 8 degree 8 matrix is shown as an example, when the matrix is a Hadamard matrix, the degree n of the matrix is a multiple of 4. Further, although Hadamard matrices also exist when n is 1 and 2, a one degree matrix and 2 degree matrix cannot be applied to a plurality of data transmission signals.

Figure 5:
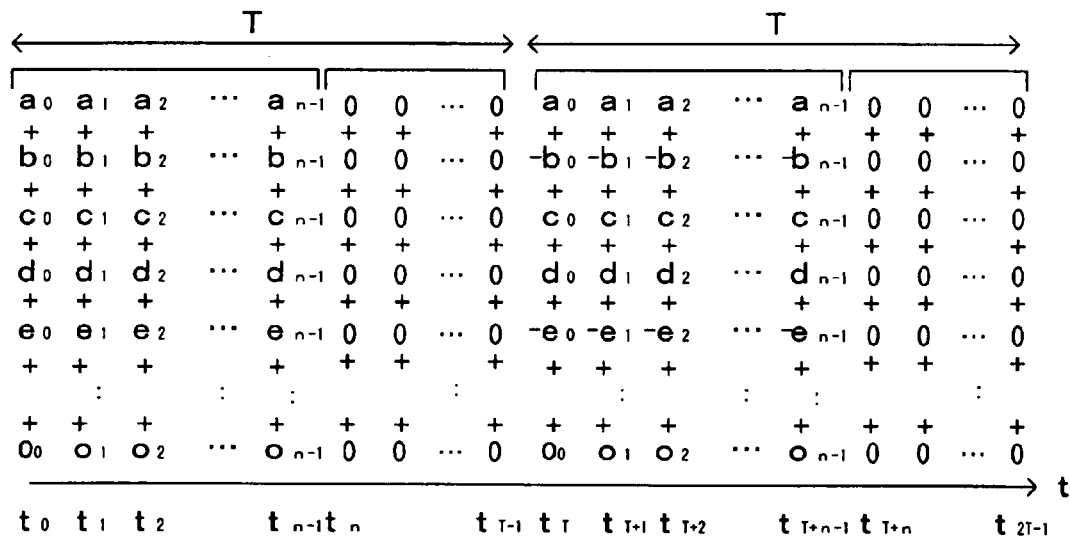
FIG. 5 serves to illustrate the transmission signals that are transmitted by means of the data transmission signal array formed by the present invention.

FIG. 5 serves to illustrate the transmission signals that are transmitted by means of the data transmission signal array thus formed. Supposing that the multipath characteristic measurement signal An and data transmission signals Bn to On are An=$a_0 \, a_1 \ldots a_{n-1}$, Bn=$b_0 \, b_1 \ldots b_{n-1}$, ..., and On=$o_0 \, o_1 \ldots o_{n-1}$, the transmission transmitted in each time slot is the sum of the respective signals. For example, in time slot $t_0$, this is the sum of the respective signals, i.e. $a_0+b_0+\ldots+o_0$. In time slot $t_1$, this is the sum of the respective signals, i.e. $a_1+b_1+\ldots+o_1$ and, similarly thereafter, in time slot $t_{n-1}$, this is the sum of the respective signals, i.e. $a_{n-1}+b_{n-1}+\ldots o_{n-1}$. Further, as a result of the 0 signals disposed between the respective signals, a 0 signal is in time slots $t_n$ to $t_{T-1}$.

As mentioned earlier, the multipath characteristic measurement signal An and data transmission signals Bn to On undergo signal addition with the time interval T between the time slots $t_0$ to $t_{T-1}$ serving as the unit. In the next time interval T, a calculation for the signals obtained by multiplying the next column of the matrix by a set coefficient is performed.

A constitutional example of the matrix employed will be described next by using FIG. 6. A plurality of matrices that are used in the signal spread modulation can have a constitution in which a plurality of n by n matrices are used as shown in FIGS. 6A and 6B. The constitutional example shown in FIG. 6B is a constitution in which a plurality of matrices containing fractions are used and the number of row vectors in one matrix is increased in accordance with the number of transmitted data transmission signals.

Further, as shown in FIG. 6C, a constitution in which k by n matrices are formed by selecting the common row vector and other row vectors from the matrices in FIGS. 6A and 6B is also possible.

The calculation of the Kronecker product that is performed between the data transmission signals is the same irrespective of the matrix constitution.

Furthermore, the matrix constitution used by the present invention can be applied to a plurality of users or applied to one user. FIG. 7 serves to illustrate the application, to users, of the matrix constitution employed by the present invention.

Figure 7A:
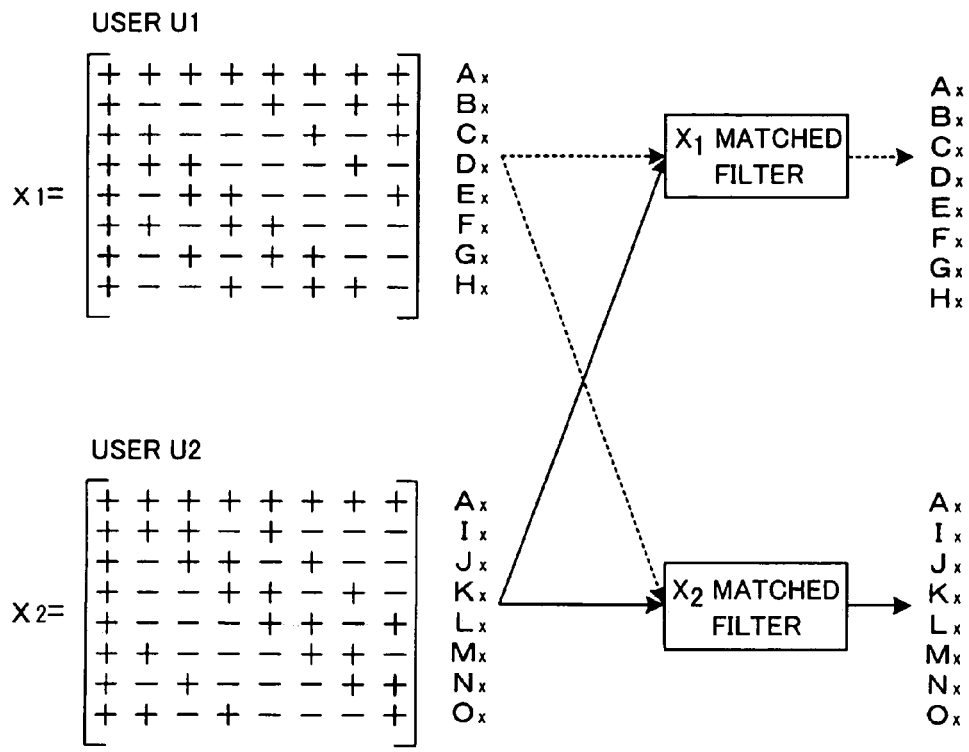
FIG. 7 serves to illustrate the application to the user of the matrix constitution used by the present invention.

FIG. 7A shows a case where two matrices X1 and X2 comprising a common row vector are applied to user U1 and user U2 respectively. User U1 spread-modulates the multipath characteristic measurement signal Ax and data transmission signals Bx to Hx by using matrix X1. Further, user U2 spread-modulates the multipath characteristic measurement signal Ax and data transmission signals Ix to Ox by using matrix X2.

The data transmission signal array obtained by the spread modulation is received via the transmission system and data transmission signals are extracted by means of a matched filter.

User U1 comprises a matched filter that corresponds with matrix X1 and demodulates the data transmission signal that has been spread-modulated by matrix X1 to extract the multipath characteristic measurement signal Ax and data transmission signals Bx to Hx. Meanwhile, user U2 comprises a matched filter that corresponds with matrix X2 and demodulates the data transmission signal that has been spread-modulated by matrix X2 to extract the multipath characteristic measurement signal Ax and data transmission signals Ix to Ox.

In this transmission system, irrespective of the user, the multipath characteristic measurement signal Ax does not interfere with the data transmission signals Bx to Hx and data transmission signals Ix to Ox and can therefore be extracted separately without a constitution subject to the effect of the multipath characteristic.

Figure 7B:
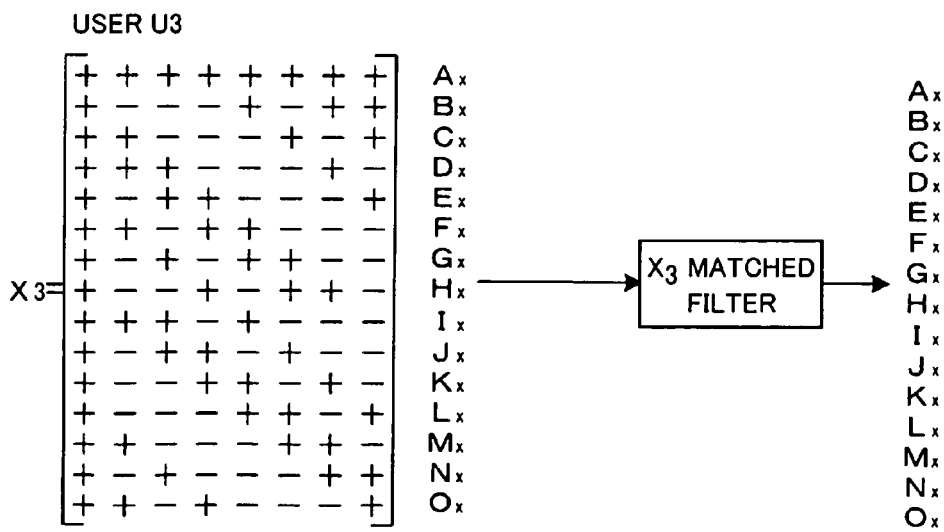

FIG. 7B shows a case where a matrix X3, which comprises one row vector and a plurality of row vectors that are orthogonal to this row vector are applied to one user U3. User U3 spread-modulates a multipath characteristic measurement signal Ax and data transmission signals Bx to Ox by using matrix X3.

The data transmission signal array obtained by the spread modulation is received via the transmission system and data transmission signals are extracted by means of a matched filter.

User U3 comprises a matched filter that corresponds with matrix X3 and demodulates the data transmission signal that has been spread-modulated by matrix X3 to extract the multipath characteristic measurement signal Ax and data transmission signals Bx to Ox.

In this transmission system, the multipath characteristic measurement signal Ax does not interfere with the data transmission signals Bx to Ox and can therefore be extracted separately without a constitution subject to the effect of the multipath characteristic.

The communication method of the present invention that employs the transmission signal thus formed will be described next.

The transmission signal thus formed can be extracted by means of a matched filter that corresponds with the respective coefficients of the spreading sequence used in the formation of the transmission signal. For example, the matched filter is a filter that extracts transmission data A by means of despreading and is formed in correspondence with the coefficients of the spreading sequence used in the formation of transmission data A.

The relationship between the I/O signal and matched filter is decided on the basis of the complete complementarity that the spreading sequence has. FIG. 8 shows the relationship between the I/O signal and matched filter.

Figure 8A:
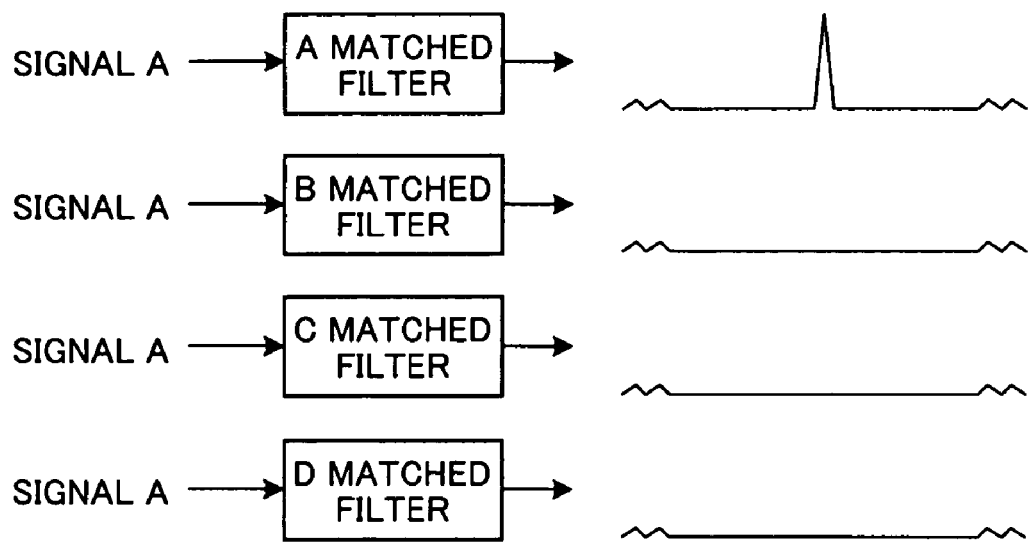
FIG. 8 shows the relationship between an I/O signal and the matched filter according to the present invention.

For example, in FIG. 8A, when signal A passes through the signal A matched filter, an impulse-like signal can be obtained from the autocorrelation characteristic. However, when signal A passes through matched filters other than the signal A matched filter (signal B matched filter to signal D matched filter), the signal is not obtained from the mutual correlation characteristic.

Figure 8B:
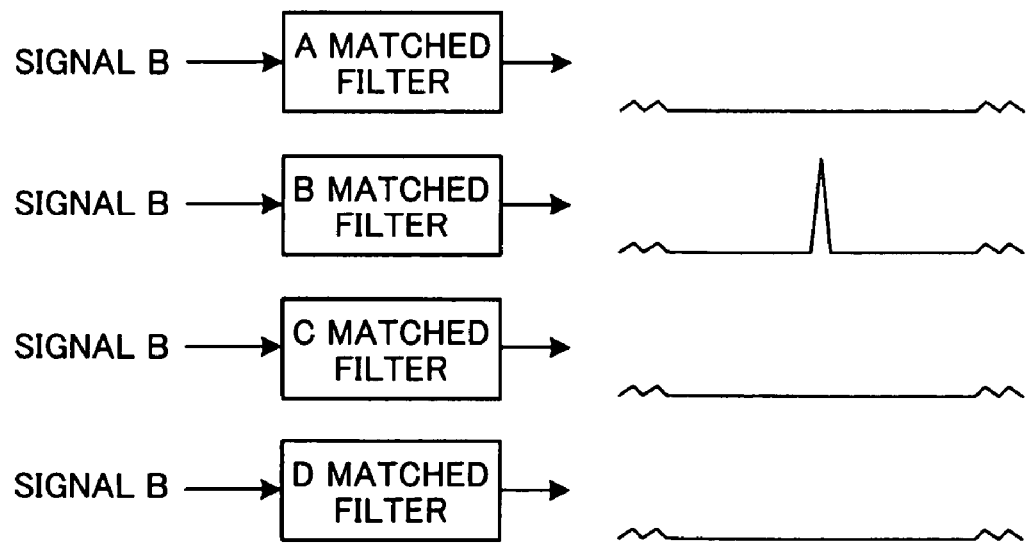

Further, in FIG. 8B, when signal B passes through the signal B matched filter, an impulse-like signal can be obtained from the autocorrelation characteristic. However, when signal B passes through matched filters other than the signal B matched filter (signal A matched filter, signal C matched filter, and signal D matched filter), the signal is not obtained from the mutual correlation characteristic.

Figure 9:
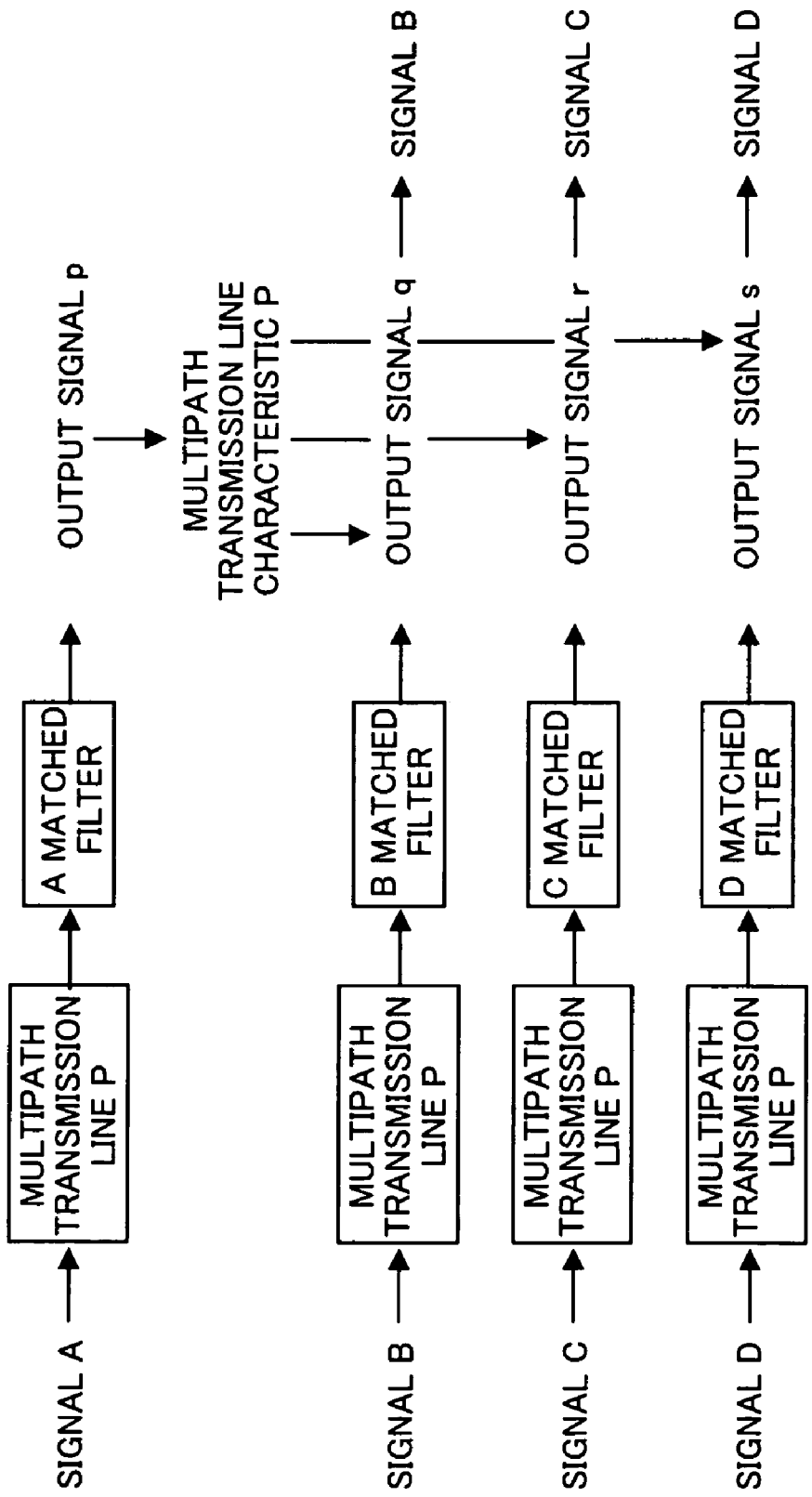
FIG. 9 serves to illustrate the state of a data array when a signal passes through the matched filter.

The detection of a multipath characteristic and the removal of the multipath characteristic from a reception signal will be described next. FIG. 9 serves to illustrate the relationship between a multipath characteristic measurement signal and a data transmission signal.

In FIG. 9, for example, supposing that signal A is the multipath characteristic measurement signal, when an output signal p is found via the signal A matched filter A after passing through the multipath transmission line P, the multipath characteristic P of the multipath transmission line can be found from the output signal p.

When it is assumed that signals B to D are data transmission signals and signals B to D pass simultaneously via the same multipath transmission line P as the multipath characteristic measurement signal, the effect of the same multipath characteristic is received from the multipath transmission line P. As a result, the same multipath characteristic is contained in the output signals q, r, s that are obtained via the respective matched filters B, C, and D. Therefore, data transmission signals B, C and D can be found by removing the multipath characteristic P from the output signals q, r, s by using the multipath characteristic P found by means of the multipath characteristic measurement signal.

Here, it is assumed that the multipath characteristic P is P=(p0, p1, p2, p3). Further, pk is a multipath factor in the respective delay times of the time slots 0, 1, 2, 3. This multipath characteristic P can be found by using the matched filter of the multipath characteristic measurement signal to detect the multipath characteristic measurement signal that has passed through the multipath transmission line, for example.

Figure 10:
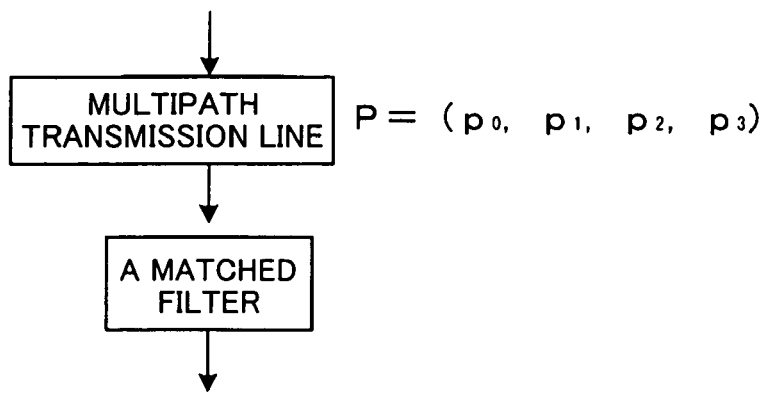
FIG. 10 serves to illustrate the detection of the multipath characteristic of the present invention.

As mentioned earlier, a transmission signal A is formed by applying a delay time T in one coefficient array of the row vectors of the orthogonal square matrices to the transmission data and, after the transmission signal A has passed through the multipath transmission line P, the reception signal A' is received through detection by means of a signal A matched filter. FIG. 10 serves to illustrate the detection of the multipath characteristic by using the multipath characteristic measurement signal.

A' can be found by calculating the output signal for each delay time as shown in FIG. 10 and represented by the following equation.

$$A'=4(x,x,\ldots,x,x,0,0,0,0,0,0,0,0,p0,p1,p2,p3,0,0,0,0,\\0,x,x,\ldots,x,x)$$

x represents a certain value.

Therefore, the reception signal A' is contained in a state where the multipath characteristic P=(p0, p1, p2, p3) can be separated.

Meanwhile, the transmission signals that pass through the same multipath transmission line can be represented as follows. Further, FIG. 11 serves to illustrate the communication state of the transmission signal.

Supposing that the data transmission signal is (b0, b1, b2, b3, b4, b5), the transmission signal is formed by using a row vector coefficient array that is different from the row vector coefficient array used in the formation of the multipath characteristic measurement signal.

The transmission signal is represented by (b0, b1, b2, b3, b4, b5, 0, 0, 0, −b0, −b1, −b2, −b3, −b4, −b5, 0, 0, 0, b0, b1, b2, b3, b4, b5, 0, 0, 0, −b0, −b1, −b2, −b3, −b4, −b5, 0, 0, 0) by using a data transmission signal and a row vector coefficient array.

Here, supposing that the signal that passes through the multipath transmission line P is B', the reception signal detected by the signal B matched filter can be found by means of convolution of signal B' and matched filter B.

$B' * Bf$ is expressed by $$= 4p0(\cdots, x, 0, 0, 0, b0, b1, b2, b3, b4, b5, 0, 0, 0, x, x, x, x\cdots) +\\ 4p1(\cdots, x, x, 0, 0, 0, b0, b1, b2, b3, b4, b5, 0, 0, 0, x, x, x\cdots) +\\ 4p2(\cdots, x, x, x, 0, 0, 0, b0, b1, b2, b3, b4, b5, 0, 0, 0, x, x, \cdots) +\\ 4p3(\cdots, x, x, x, x, 0, 0, 0, b0, b1, b2, b3, b4, b5, 0, 0, 0, x, \cdots)\\ = (\cdots, x, x, x, x, q1, q2, q3, q4, q5, q6, q7, q8, x, x, x, x, \cdots)$$

Further, Bf corresponds with the matched filter B.

Here, q1, q2, q3, q4, q5, q6, q7, q8 can be found directly as the output of the matched filter.

Figures 11A, 11B:
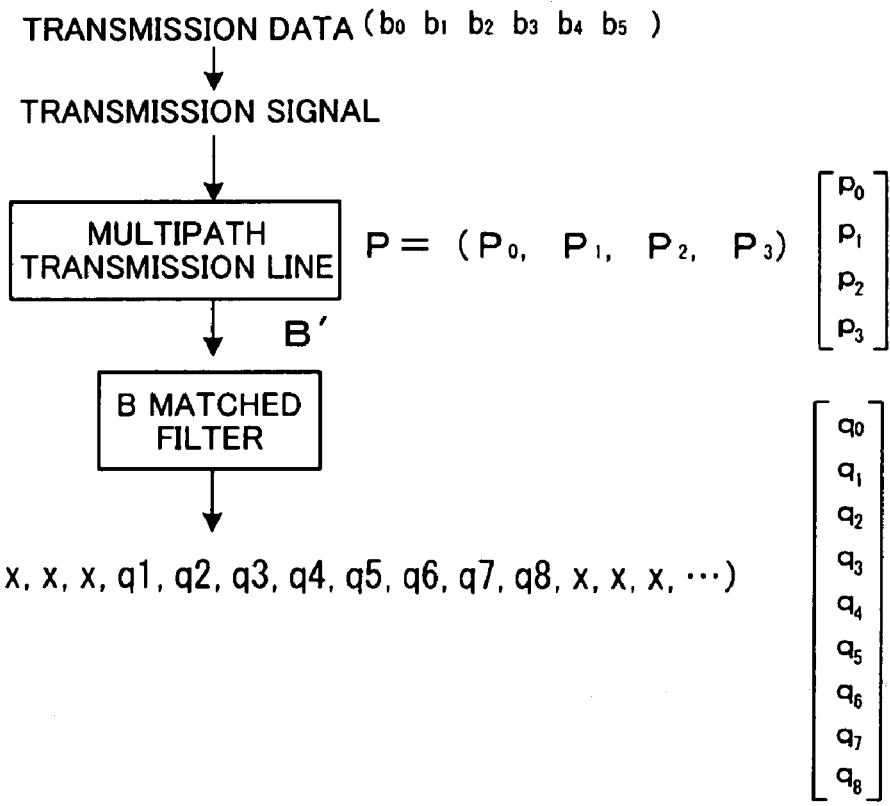
FIG. 11 serves to illustrate the communication state of the transmission signal.

FIG. 11A schematically shows the relationship between a transmission signal, the multipath characteristic P of the multipath transmission line, and the output of the B matched filter and the relationship therebetween can be represented by the relational equation shown in FIG. 11A.

In the relational equation shown in FIG. 11A, (p0, p1, p2, p3), which represents the multipath characteristic, can be found by detecting the multipath characteristic measurement signal and (q0, q1, q2, q3, q4, q5, q6, q7, q8) can be found by detecting the transmission signal.

Therefore, the transmission data (b0, b1, b2, b3, b4, b5) can be found from the equation shown in FIG. 11B by using (p0, p1, p2, p3) and (q0, q1, q2, q3, q4, q5, q6, q7, q8).

A constitutional example of a matched filter will be described next.

FIG. 12 shows a constitutional example of a matched filter. Further, signals A to D are formed by applying a delay to a ZCZ sequence.

FIG. 12A is a constitutional example of a signal A matched filter that corresponds with a vector row (1, 1, 1, 1), for example, and shows a case with a delay time 9t. FIGS. 12B, 12C, and 12D show a constitutional example of matched filters of signals B, C, and D that correspond with the respective vector rows (1, −1, 1, −1), (1, 1, −1, −1), (1, −1, −1, 1) and likewise show cases where the delay time is 9t.

The constitution for feeding back the multipath characteristic thus found to the transmission side will be described next.

Targets for adjusting the multipath characteristic through feedback include the number of matrices (row vectors) used in the spread modulation of data transmission signals and the time interval in the signal sequences of the transmitted data transmission signals.

Figures 13A, 13B:
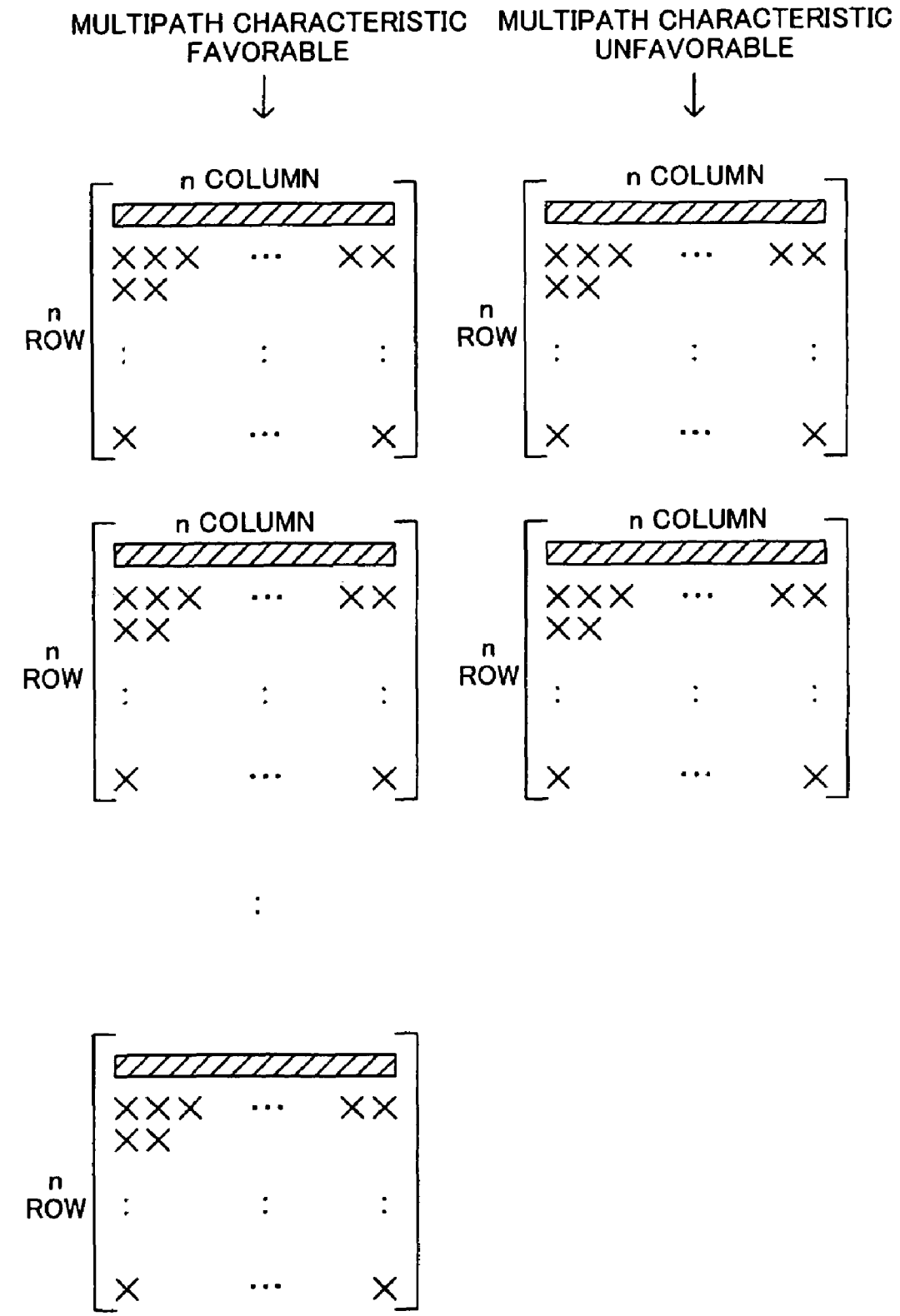
FIG. 13 serves to illustrate adjustment of the number of matrices (row vectors) used in the spread modulation of data transmission signals.

First, the adjustment of the number of matrices (row vectors) used in the spread modulation of data transmission signals will be described by using FIG. 13.

The multipath characteristic represents the extent of the influence on the data transmission signal exerted by the transmission system of the multipath transmission line. A multiplicity of data transmission signals can be transmitted by the same transmission system when the multipath characteristic is favorable and, conversely, only a small number of data transmission signals can be transmitted by the same transmission system when the multipath characteristic is unfavorable.

In the case of the present invention, the number of transmitted data transmission signals is proportional to the number of row vectors of the matrix used. Therefore, the multipath characteristic detected is fed back to the transmission side and the number of matrices (number of row vectors) used in the spread modulation of the data transmission signal is adjusted to maximize the data transmission signals that can be transmitted by the transmission system in accordance with the multipath characteristic. Adjustment can be performed such that the maximum transmission efficiency, which is adapted to the multipath characteristic of the transmission system, is always obtained by increasing the number of data transmission signals by increasing the number of matrices (row vectors) when the multipath characteristic is favorable in FIG. 13A, and, on the other hand, reducing the number of data transmission signals by reducing the number of matrices (row vectors) when the multipath characteristic is unfavorable in FIG. 13B.

Adjustment of the time interval in the signal sequence of the transmitted data transmission signal will be described next by using FIGS. 14 and 15.

Figure 14:
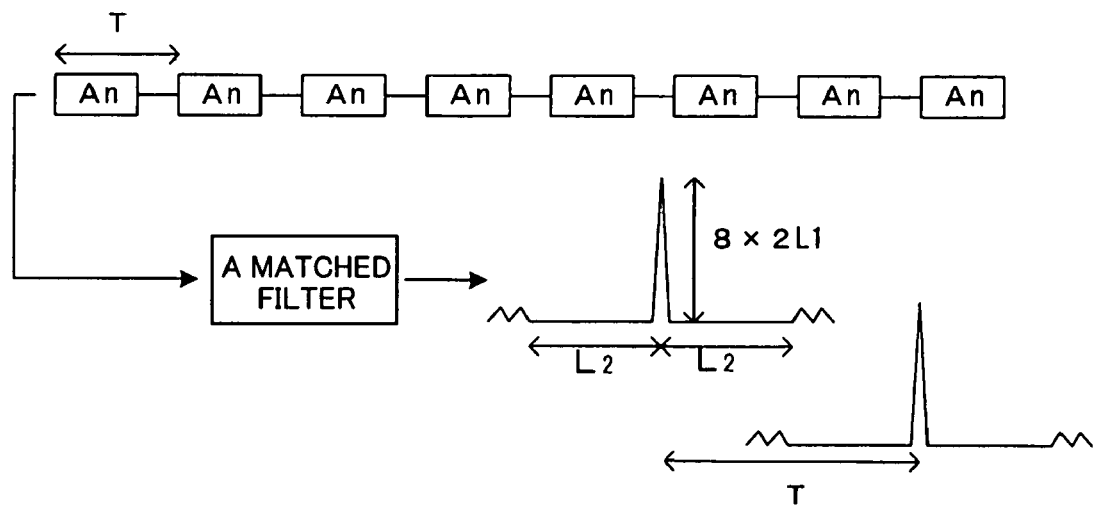
FIG. 14 shows the relationship between the signal length L1 of a signal sequence formed by applying a delay to the ZCZ sequence and a delay L2, and the signal waveform of the output signal of the matched filter.
Figure 16:
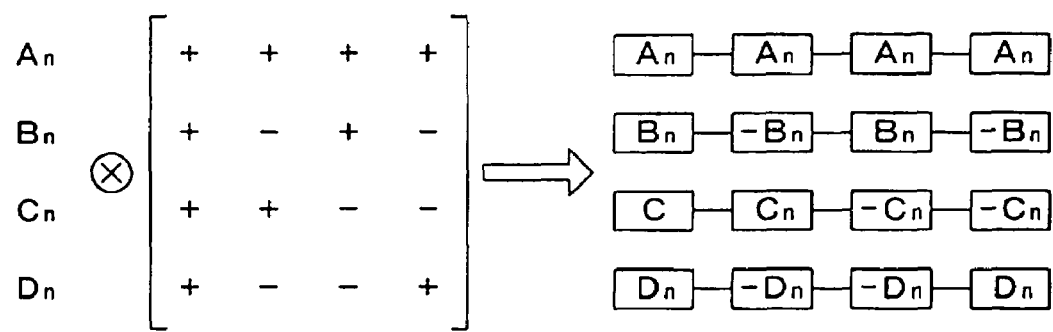
FIG. 16 serves to illustrate an example of a conventionally proposed signal design method.

FIG. 14 shows the relationship between the signal length L1 of a signal sequence and a delay L2 formed by applying a delay to the ZCZ sequence and the signal waveform of the output signal of the matched filter.

The signal sequences An are formed by repeating the signal array of the ZCZ sequence of signal length L1 and the delay of length L2 and the signal sequences An are transmitted after being spread-modulated by using a spread matrix at time interval T before being demodulated by means of a matched filter that corresponds with the spread matrix. The output signal thus obtained has a signal level of n×2L1 and the time interval between the signal and noise component is L2. Further, the time interval between one signal and the next signal is the time interval T between signal sequences An. n corresponds to the number of columns of the spread matrix and the signal level of the output signal can be raised by performing spread modulation by using a spread matrix. For example, when spread modulation is performed by using an 8 by 8 matrix, the signal level of the output signal obtained is 8×2L1 times the signal level of the transmission signal.

In the case of output signals, when noise exists between adjacent signals as a result of the multipath characteristic, identification of signals is difficult. When the multipath characteristic is favorable, output signals can be identified even when the time interval T between adjacent output signals is narrow. However, when the multipath characteristic is unfavorable, the time interval T between adjacent output signals must be sufficient in order to identify output signals.

In the spread modulation of the present invention, the time interval T between one signal and the next signal is decided by the time interval T between signal sequences An. Therefore, the detected multipath characteristic is fed back to the transmission side and the time interval T between the signal sequences An is adjusted so that the time interval T permitting identification between successive output signals is short in accordance with the multipath characteristic. The time interval T is related to the transmission wait time up until the transmission signals have all been sent, the processing time up until completion of the reception processing, the scale of the device required for processing, and, therefore, the time interval T is desirably as short as possible.

Adjustment can be performed to minimize the transmission wait time and the reception signal processing time and so forth to always adapting to the multipath characteristic of the transmission system by shortening the time interval Ta between the signal sequences An when the multipath characteristic is favorable in FIG. 15A but, on the other hand, lengthening the time interval Tb between the signal sequences An when the multipath characteristic is unfavorable in FIG. 15B.

Further, although an example in which a row vector is employed as the common vector was illustrated in the above description, a column vector can likewise also be employed. When the process is performed based on column vectors, adaptation is possible by substituting the row vectors of the above description for column vectors.

In the present invention, the larger the number of row vectors used in spread modulation, the larger the number of signals of the transmitted data transmission signals can be and the information transmission efficiency and information transmission accuracy can be raised.

Furthermore, as the number of columns of the matrix used in the spread modulation decreases, the scale of the reception-side device can be reduced and the data processing time can be shortened.

Furthermore, as the number of columns of the matrix used in the spread modulation decreases, the transmission-side wait time can be shortened.

Moreover, as the number of columns of the matrix used in the spread modulation increases, the signal strength of the multipath characteristic measurement signal can be raised.

In addition, as the matrix used in the spread modulation decreases in size, responsiveness to changes in the multipath characteristic can be raised.

INDUSTRIAL APPLICABILITY

The present invention is preferable for environments susceptible to multipath-induced effects of cellular wireless communications and a variety of mobile environments.

The invention claimed is:

1. A communication method, comprising:
transmitting a multipath characteristic measurement signal and a plurality of data transmission signals from a transmitter device of a communication system, the multipath characteristic measurement signal and data transmission signals being received by a reception processing device of the communication system,
wherein, in the reception processing device, the multipath characteristic measurement signal and data transmission signals are a signal array formed by a plurality of coefficient matrices each having row vectors that are orthogonal to one another within the matrices and which comprise at least one coefficient array that is common in the column direction or row direction; and
the multipath characteristic measurement signal formed by the respective coefficient matrices is the same signal array formed by the at least one common coefficient array,
wherein a multipath characteristic measurement signal array is formed by using one row vector or column vector coefficient array with respect to the multipath characteristic measurement signal, and, by forming a data transmission signal array by using a row vector coefficient array that is orthogonal to the row vector or a column vector coefficient array that is orthogonal to the column vector with respect to the plurality of data transmission signals, the transmitted multipath characteristic measurement signal and plurality of data transmission signals are uncorrelated.

2. The communication method according to claim 1, wherein the row vector or column vector is a row vector or column vector that a Hadamard matrix or unitary matrix comprises.

3. The communication method according to claim 1, wherein the number of row vectors or column vectors used in the formation of the data transmission signal array is established on the basis of the received multipath characteristic measurement signals.

4. The communication method according to claim 1, wherein the interval between the multipath characteristic measurement signals in the multipath characteristic measurement signal array and the interval between the data transmission signals in the data transmission signal array are changed on the basis of the received multipath characteristic measurement signals.

5. The communication method according to claim 1, wherein an arbitrary user arbitrarily has a matched filter that corresponds with a coefficient array that is used in the formation of a transmission data array and receives an arbitrary data transmission signal via the matched filter.

6. A method of forming a transmission signal in a reception processing device, comprising the steps of:
forming, in the reception processing device, a matrix of an arbitrary length by selecting, from a plurality of orthogonal square matrices that comprise a common row vector or column vector, the common row vector or column vector and an arbitrary number of row vectors or column vectors that are orthogonal to the common row vector or column vector;
forming, in the reception processing device, a multipath characteristic measurement signal array by multiplying each of the coefficient arrays of the common row vector or column vector by a multipath characteristic measurement signal;
forming, in the reception processing device, a data transmission signal array by multiplying each of the coefficient arrays of the row vector or column vector other than the common row vector or column vector in the matrix by each of the plurality of data transmission signals; and rendering, in the reception processing device, the multipath characteristic measurement signal array and data transmission signal array a transmission signals wherein, when forming the multipath characteristic measurement signal array and the data transmission signal array by multiplying the respective row vector or column vector coefficient arrays by the multipath characteristic measurement signal and data transmission signal, zero data sequence of a predetermined length is added between the respective signals multiplied by the coefficient arrays and the interval between the multipath characteristic measurement signals in the multipath characteristic measurement signal array and the interval between the data transmission signals in the data transmission signal array are determined.

7. The method of forming a transmission signal according to claim 6, wherein the orthogonal square matrix is a Hadamard matrix or a unitary matrix.

8. The communication method according to claim 6, wherein the number of row vectors or column vectors used in the formation of the data transmission signal array is established on the basis of the received multipath characteristic measurement signals.

9. The method of forming a transmission signal according to claim 6, wherein the interval between the multipath characteristic measurement signals in the multipath characteristic measurement signal array and the interval between the data transmission signals in the data transmission signal array are changed on the basis of the received multipath characteristic measurement signals.

* * * * *